United States Patent
Schwabacher et al.

(10) Patent No.: US 11,294,616 B2
(45) Date of Patent: *Apr. 5, 2022

(54) SYSTEMS AND METHODS FOR THE SECURE SYNCHRONIZATION OF USER INTERFACE STATE AMONGST COMPUTING DEVICES

(71) Applicant: BlueOwl, LLC, San Francisco, CA (US)

(72) Inventors: Charles O. Schwabacher, Oakland, CA (US); Hans Oksendahl, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/088,797

(22) Filed: Nov. 4, 2020

(65) Prior Publication Data

US 2021/0048973 A1 Feb. 18, 2021

Related U.S. Application Data

(63) Continuation of application No. 16/173,528, filed on Oct. 29, 2018, now Pat. No. 10,853,019.

(51) Int. Cl.
| | |
|---|---|
| *G06F 21/62* | (2013.01) |
| *G06F 21/84* | (2013.01) |
| *H04L 29/08* | (2006.01) |
| *G06F 3/14* | (2006.01) |
| *H04L 67/025* | (2022.01) |

(52) U.S. Cl.
CPC ............ *G06F 3/1454* (2013.01); *G06F 21/62* (2013.01); *G06F 21/84* (2013.01); *H04L 67/025* (2013.01); *G06F 2221/032* (2013.01)

(58) Field of Classification Search
CPC ........ G06F 3/1454; G06F 21/62; G06F 21/84; G06F 2221/032; H04L 67/025
See application file for complete search history.

(56) References Cited

U.S. PATENT DOCUMENTS

| | | | |
|---|---|---|---|
| 6,138,120 A * | 10/2000 | Gongwer | ................ H04L 67/42 |
| 6,871,213 B1 | 3/2005 | Graham et al. | |
| 8,191,152 B1 | 5/2012 | Barker et al. | |
| 10,382,620 B1 | 8/2019 | Allen et al. | |
| 10,692,147 B1 * | 6/2020 | Ruble | ................... G06Q 40/06 |

(Continued)

*Primary Examiner* — Shourjo Dasgupta
(74) *Attorney, Agent, or Firm* — Faegre Drinker Biddle & Reath LLP-Blue Owl (57) ABSTRACT

The current disclosure relates to a system and method for secured screen sharing. A specially configured screen sharing server of the system may facilitate screen sharing between two independent and remote devices. The system may be configured to access state information from a primary client device. The system may then determine if any of the elements of the application state primary client interface correspond to sensitive information. The system may then mask the primary client interface to create a replica client interface by masking any elements of the application state that correspond to sensitive information. The system may then cause the replica client device to display the replica client interface by transmitting the application state to the replica client interface.

16 Claims, 7 Drawing Sheets

(56) References Cited

U.S. PATENT DOCUMENTS

| | | |
|---|---|---|
| 2007/0067852 A1* | 3/2007 | James .................. G06F 21/6245 726/28 |
| 2012/0036452 A1 | 2/2012 | Coleman et al. |
| 2013/0036370 A1 | 2/2013 | Ananthakrishnan |
| 2013/0194374 A1 | 8/2013 | Kieft et al. |
| 2014/0013452 A1 | 1/2014 | Aissi et al. |
| 2014/0150114 A1 | 5/2014 | Sinha et al. |
| 2015/0278534 A1 | 10/2015 | Thiyagarajan et al. |
| 2016/0092054 A1 | 3/2016 | Tomono et al. |
| 2017/0178234 A1 | 6/2017 | Jezek et al. |
| 2018/0288164 A1 | 10/2018 | Sharma et al. |
| 2019/0163927 A1 | 5/2019 | Kochura et al. |

* cited by examiner

SYSTEMS AND METHODS FOR THE SECURE SYNCHRONIZATION OF USER INTERFACE STATE AMONGST COMPUTING DEVICES

CROSS-REFERENCE TO RELATED APPLICATION

The present application is a continuation of U.S. Non-Provisional application Ser. No. 16/173,528, filed Oct. 29, 2018, the entire disclosure of which is hereby expressly incorporated herein by reference.

FIELD OF THE DISCLOSURE

This disclosure relates to a system and method for providing secured screen state synchronization between computing devices. In particular, the methods and systems may include synchronizing the state of a user interface between a primary client and a replica client via a computer network to facilitate the protection of sensitive information.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Screen sharing, also known as desktop sharing, is a technique that allows for multiple users to simultaneously view the same user-interface(s) across different devices. In some embodiments, the multiple users may simultaneously view the same state, or data, as rendered within the same user-interface(s). Over the last few years screen sharing has quickly increased in popularity because it is useful in many different scenarios. For example, screen sharing can be useful for group collaborations, computer troubleshooting, customer service in e-commerce, etc.

However, the rise in the popularity of screen sharing has not been accompanied by adequate privacy controls for preventing the dissemination of sensitive information and/or personally identifiable information (defined herein to include personal information, banking information, protected health information under federal statutes such as the Health Insurance Portability and Accountability Act, etc.). There is therefore a need for methods and systems for facilitating screen sharing which include built-in capabilities for receiving information, analyzing the information to determine whether the information includes sensitive information, and transmitting only that information which does not include sensitive information, of that information from which sensitive information has been removed.

BRIEF SUMMARY

The present disclosure generally relates to systems and methods for synchronizing application state between computing devices. Embodiments of exemplary systems and computer-implemented methods are summarized below. The methods and systems summarized below may include additional, fewer, or alternate components, functionality, and/or actions, including those discussed elsewhere herein.

In one aspect, a method for providing secured screen sharing may include receiving an indication to initiate a screen sharing session with a second client device, wherein the first client device and second client device are remote of one another and independent of one another. The method may include receiving state information comprising at least one state value corresponding to a respective user interface input, analyzing one or both of (i) the at least one state value, and (ii) the respective user interface input to locate sensitive information included in the at least one state value, and masking the sensitive information included in the at least one state value. The method may further include generating a replica client interface, the replica client interface including at least one replica user interface input corresponding to the respective user interface input, and the at least one replica user interface input including the masked sensitive information, and displaying the replica client interface in a display device of the second client device.

In another aspect, a system for providing secured screen sharing may include a server including one or more processors, a replica client device including a user interface, and a primary client device including a user interface and one or more processors and one or more memories. The memories may include computer-readable instructions that, when executed by the one or more processors, cause the one or more processors to receive an indication to initiate a screen sharing session with the replica client device, wherein the replica client device and the primary client device are remote and independent of one another. The instructions may further cause the one or more processors to receive state information comprising at least one state value corresponding to a respective user interface input, and analyze one or both of (i) the at least one state value, and (ii) the respective user interface input to locate sensitive information included in the at least one state value. The instructions may further cause the one or more processors to mask the sensitive information included in the at least one state value and to generate a replica client interface, the replica client interface including at least one replica user interface input corresponding to the respective user interface input, and the at least one replica user interface input including the masked sensitive information. The instructions may further cause the one or more processors to display the replica client interface in a display device of the replica client device.

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

The embodiments described herein relate to, inter alia, a system and method for secured screen sharing, wherein sensitive information in a first client interface display is withheld, obscured, and/or omitted from a second client interface display. Screen sharing is a useful tool that can be used to augment human interactions. However, current screen sharing techniques have deficiencies that prevent the technology from being useful in many common situations. For example, a user may not want to enable screen sharing if the user is viewing personal, sensitive, and/or proprietary information may be omitted, whereas other application state (e.g., field values, mouse position, non-sensitive information, etc.) may be transmitted to a replica client.

Figure 1:
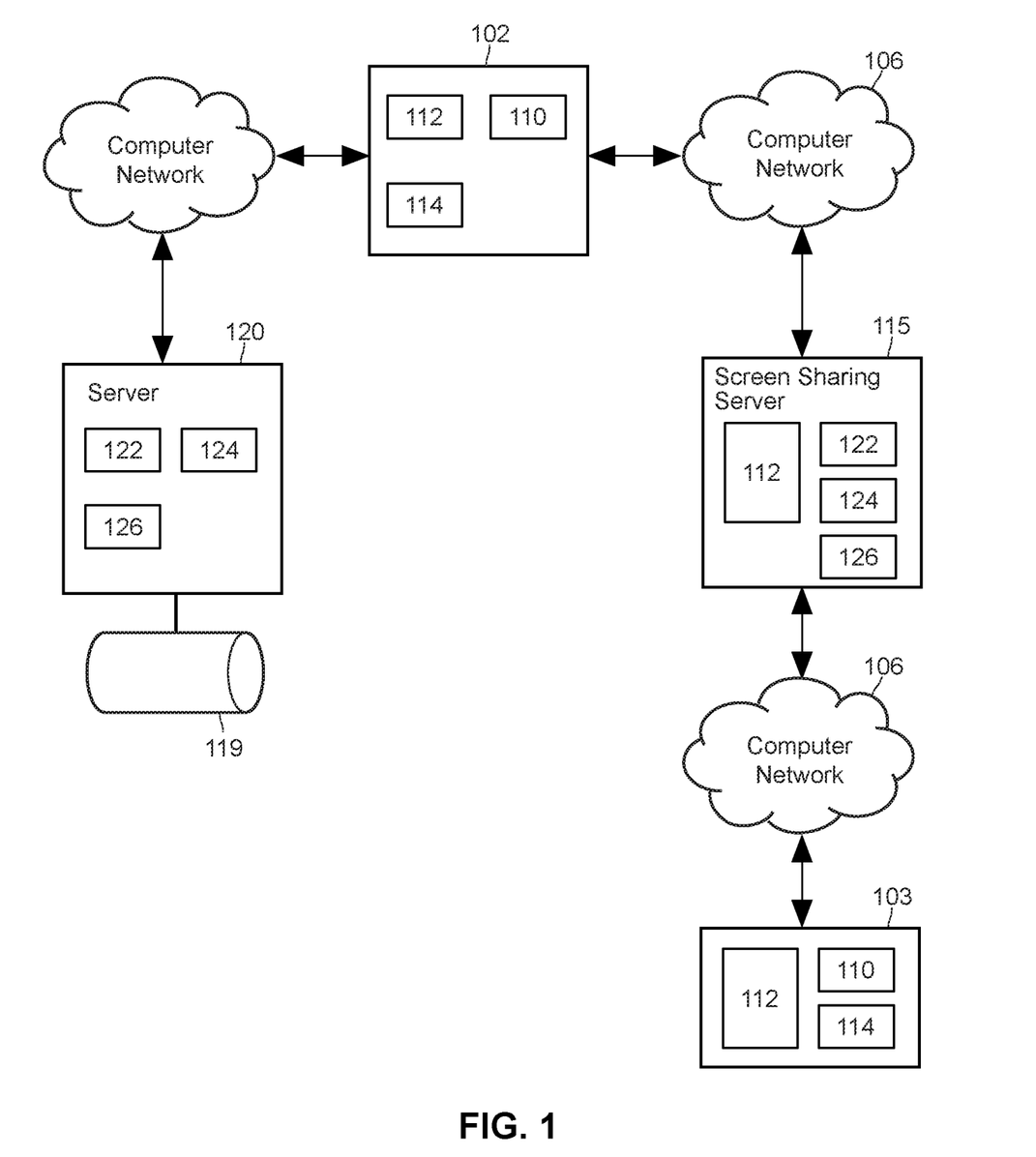
FIG. 1 is a simplified and exemplary block diagram of a system for secured screen sharing.

FIG. 1 depicts an example system 100 for secured screen sharing. The system 100 may include front-end user devices (e.g., client device 102 and client device 103) and backend components (e.g., server 115 and server 120). The front-end user devices and backend components may be communicatively coupled via a network 106 (e.g., a computer network, an internet connection, etc.). The system 100 may allow secured screen sharing amongst multiple front-end user devices and/or backend components. The system 100 may include software and/or computer-executable instructions and/or hardware components/modules which may employ the software and/or instructions to facilitate secured screen sharing functionality. The software may be implemented as one or more computer-readable storage memory containing computer-readable instructions (i.e., software). The computer-readable instructions may be executed by one or more processor of the system 100. The system 100 also may include hardware and/or software applications, as well as data communication channels for communicating data between the hardware and/or software components. For example, the system 100 may include local and/or distributed message queues. In an embodiment, a client device 102 and a server 115 may communicate data and/or computer instructions via the network 106. The system 100 may include entities in a client device 102 which may communicate with a backend component via the network 106 to provide secured screen sharing functionality. In an embodiment, client device 102 and server 115 may communicate via WebSockets, or via another suitable transport layer over a TCP/IP connection. WebSockets may be encrypted, as specified by the Internet Engineering Task Force in RFC6455.

In an embodiment, a client device (e.g., the client device 102 and/or client device 103) may execute a screen sharing tool 112 and a graphical user interface (UI) 110 within a web browser 114. The client device may be any suitable computing device such as a personal computer, smart phone, tablet computer, etc. The UI 110 may communicate with the system 100 through the network 106 or other type of suitable network (e.g., a local area network (LAN), a metropolitan area network (MAN), a wide area network (WAN), a mobile network, a wired or wireless network, a private network, a virtual private network, etc.). System 100 may include one or more application, such as a cloud-based application, a web-based interface for querying and/or displaying data from a database 119, a software application executing on the computing device 102, and/or an application including instructions executed and/or stored within any component of the system 100. The one or more application, UI 110, browser 114, and screen sharing tool 112 may be stored in various locations including separate physical storage devices and/or transitory memories.

A server 120 may send and receive information and data (e.g., data from the database 119) for the system 100 such as computer-executable instructions and data associated with applications executing on the client device 102 (e.g., the screen sharing tool 112). In an embodiment, the server 120 may be maintained and operated by a web host or other entity for a website. The server 120 may send instructions to the client device 102 to render, or paint, data on the UI 110 using a web browser application 114 of a client device 102. The server 120 may be communicatively coupled to one or more databases, such as database 119. The screen sharing server 115 may facilitate secured screen sharing between two client devices (e.g., client device 102 and client device 103). In some embodiments, the server 120 may include computer-executable instructions 122 stored within a memory 124 of the server 120. The instructions 122 may, when executed by a processor 126, cause the server 120 to send and/or receive data from the client device 102.

The browser application 114, UI 110, screen sharing tool 112, and elements of the system 100 may be implemented at least partially on the server 115, the server 120 and/or the client device 102 and/or the client device 103. The system 100 and the processor 126 may execute the instructions 122 to cause the UI 110 to display a shared user-interface within a display of the client device 102 and the client device 103. The UI 110 may allow a user to interact with the shared user-interface, and may allow the user to input data into the shared user interfaces.

The screen sharing tool 112 may include instructions for execution by the client device 102, the client device 103, and/or the screen sharing server 115 for enabling secured screen sharing.

In operation, a first user may access the client 102. The first user may designate the client 102 a "primary" client. Then, a second user (who may be the first user, in some embodiments) may access the client 103. The first user may launch an application in the client 102, which may display information in a device associated with the client 102, and/or receive input data from the first user via an input device associated with the client 102. The first user may interact with the application executing in the client 102 as the user would normally interact with a computer application.

The first user and/or the second user may designate the client 103 a "replica" client. The client 103 may be hard-coded to the client 102 such that designating the client 103 a replica automatically has the effect of replicating the client 102. In some embodiments, the client 103 may provide a facility for a user (e.g., the first user or the second user) to select a client to replicate. The screen sharing tool 112 may intermediate requests to designate clients as "replica" and/or "primary" clients. As the first user interacts with the primary client, an application executing in the primary client may transmit, in real-time and/or with low latency, a representation of the display of the primary client to the screen sharing tool 112 and/or another client (e.g., the replica client). The screen sharing tool 112 may share the representation of the display of the primary client with one or more additional clients.

In an embodiment, the screen sharing tool 112 may cause portions of the representation to be omitted, obscured, and/or withheld from the transmitted representation. In an embodiment, the primary client may add a pixel overlay to a video capture stream, wherein the pixel overlay is opaque and/or blurred to obscure information. In another embodiment, an unmodified video stream representing the video display of the primary client may be transmitted to the replica client along with a set of coordinates ((x1,y1),(x2,y2)) such that the replica client may draw a pixel overlay using the set of coordinates to size and position the overlay. The set of coordinates may be represented in relative or absolute space with respect to the dimensions of an image included in a video representation of the primary client.

In an embodiment, the primary client and replica client may include static interfaces, which are defined by computer instructions. A primary client may display a structured data set in its respective interface. One or more of the fields comprising the structured data set may be designated with "protected" or "private" visibility. The primary client may transmit the structured data set to a replica client and/or the screen sharing tool. In an embodiment, fields having private and/or protected visibility may be stripped from the structured data set prior to transmission or after receipt by a replica client and/or the screen sharing tool 112. In other embodiments, some fields in the structured data set may be encrypted, such that a replica client and/or screen sharing tool 112 may display the structured data in the clear (i.e., without any obfuscation), but only provided that the replica client possesses a private key, password, or other decryption data. It should be appreciated that "obscuring" data may include omitting some data from the data transmitted by the primary client, and/or modifying some of the data transmitted by the primary client. In some embodiments, a replica client may receive an exact copy/mirror of the data displayed in the primary client. In some embodiments, the data transmitted may be video data (e.g., an MPEG-2 transport stream) wherein the entire video stream has been preprocessed to, for example, compress the size of the video stream. After the preprocessing, sensitive data may be obscured/omitted from the data sent to the replica server. JPEG compression and/or zlib compression may be used, in some circumstances, to improve performance, as may different pixel formats (e.g., true color, color maps, etc.) and/or encodings. The depth (e.g., number of bits per pixel) may also be adjusted to optimize for speed of data transfer in some environments.

In some embodiments, the primary client interface may correspond to a portion of the entire display of the client device 102 (e.g., a particular window corresponding to a web browser). In other embodiments, the primary client interface may correspond to the entire interface being displayed on the client device 102. Further, the screen sharing tool 112 may alter/omit/modify any number of elements from the primary client interface to create a replica client interface, discussed in greater detail below. In some embodiments, more than one screen sharing server 115 and/or more than two client device 102 may be included. Any number of servers and/or devices may be implemented in a screen sharing session.

Figure 2:
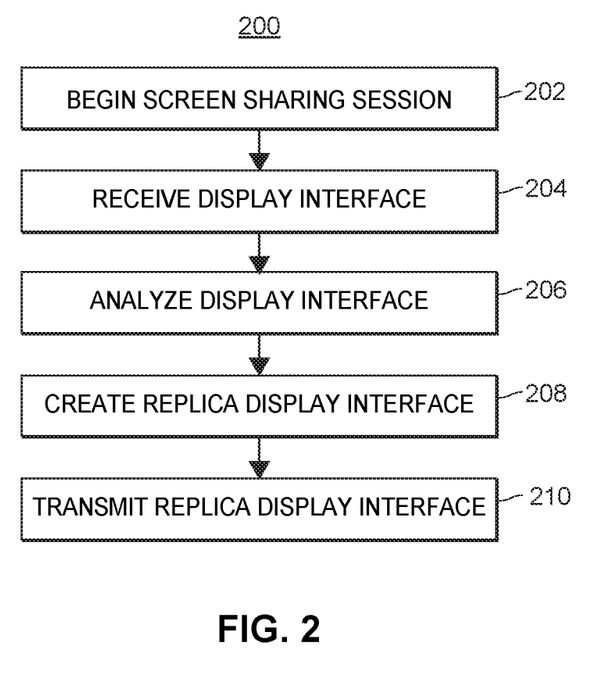
FIG. 2 is a block diagram of an example method for secured screen sharing.

FIG. 2 depicts an example method 200 for secured screen sharing which may include one or more functions defined in terms of non-transitory computer-executable instructions which are stored in a tangible computer-readable storage medium and executed using a processor of a computing device (e.g., the client device 102 and/or the client device 103, the server 115, or any combination of computing devices within the system 100). The functions may be included as part of any of the modules described in relation to FIG. 1, above, or FIG. 7 or 8, below, or as part of a module that is external to the system illustrated by FIGS. 1, 7 and 8. For example, the method 200 may be part of a browser application or another application running on the computing devices 102 and 103.

The method 200 may begin at the start of a screen sharing session (block 202). The screen sharing session may begin after receiving an indication from a primary client device to start the screen sharing session. Typically a primary client device enables a screen sharing session and the content of the primary client device is shared with one or more other client devices. In some embodiments, a second client device may request a screen sharing session with a first client device, in which case the shared display interface belongs to the first client device which accepted the request.

Once the screen sharing session has begun, the system, which may correspond to the system 100 of FIG. 1, may access a primary client interface (block 204). The primary client interface, as defined herein, may be the portion of a user interface of a first client interface that is being shared in the screen sharing session. In an embodiment, the entire user interface display of the first client device may be accessed as the primary client interface to create a replica client interface to be displayed by the second client device (e.g., see FIG. 3). In an embodiment, only a portion of the user interface display of the first client device (e.g., a window within a web browser, or a block of hypertext markup language (e.g., a paragraph)) may be accessed as the primary client interface to create a replica client interface to be displayed by the second client device.

The system may then analyze the primary client interface for sensitive information (block 206). For analytical purposes, the display interface may be deconstructed into a number of elements. For example, each icon, graphic, text input field, portion of text, mouse cursor, or any other piece of the display interface may be considered an element. Thus, the system may analyze each element of the primary client interface to determine if the element corresponds to sensitive information. It should be appreciated that the primary client may modify and/or omit sensitive data prior to transmission or, as stated above, include an indication of the location of the sensitive data along with transmitted data, which a component receiving the sensitive data may use to omit/obscure the sensitive data. As noted above, the sensitive data may be identified by pixel location relative to a window/viewport. In an embodiment, sensitive data may be identified via another selection paradigm (e.g., an X-path selection, a cascading style sheet (CSS) selector, etc.). In some cases, regular expressions and/or patterns may be used to identify, and omit, sensitive content. For example, state information may include a plurality of user interface inputs (e.g., text input fields, image fields, dropdown fields, etc.). Each of the fields may include set of respective state values. Each of the respective state values may be associated with rules dictating that all or a portion of each respective state value corresponds to sensitive information. For example, the last four digits of a social security state value may be considered sensitive information, whereas the first five characters are considered not sensitive information. As discussed herein, the "sensitivity" of a datum may be a Boolean proposition, or one relating to multiple categories (e.g., public, private, or protected).

As noted above, sensitive information may include information that should not be shared with the second client device. In an embodiment, sensitive information may include any personal information (e.g., date of birth, social security number, address, phone number, height, weight, family information) and/or financial information (e.g., credit card number, bank account information) which may be considered private. In another embodiment, sensitive information may include any information that is not necessary for the second client device in view of the purpose of the screen sharing session. For example, if a screen sharing session is initiated for troubleshooting a computer error on the first client device, then any elements of the display interface that do not relate to troubleshooting would be considered sensitive information and would not be visible to the second client device. In an embodiment, a user of the primary device may select a pre-set scope, which may determine the scope/bounds of the information permitted to be transmitted to and/or viewable by the replica client(s). For example, all fields in an interface in the primary client may be associated with one or more scope. The scope may include, for example, "personal information", "demographic information", and "voting information". While the user of the primary device may enter personal, demographic, and voting information into the interface of the primary device, a scope selection of "voting only" may limit data that can be transmitted from the primary device to the replica device to only that data that is within the "voting" scope.

The system may create a replica display interface (block 208). The interface of the replica client display may appear to be identical to the interface of the primary client display except for the elements that correspond to sensitive or out-of-scope information. The system may alter or replace the elements that belong to sensitive information. For example, the system may replace an element that corresponds to sensitive information with a black graphic of similar size and shape as the element. In another embodiment, the system may pixelate or otherwise conceal the one or more elements that correspond to sensitive information. The system may then transmit the replica client interface to a second (replica) client device for display (block 210). The system may transmit the replica client interface in any suitable manner. For example, the primary client device may send an indication of the replica client interface to the server, and then the server may send the indication of the replica client interface to the replica client device. In an embodiment, the primary client device may transmit the replica client interface to the server, where it will be stored, and then an indication of an application state of the replica client interface may be transmitted to the replica client device. In some embodiments, the screen sharing information may be stored for later viewing, wherein the stored information does not include the omitted information.

As used herein, the "primary client interface" and "replica client interface" may be used to describe an application state of a user-interface, which may include data and/or device display output (e.g., video and/or still images). Thus, the system of the present application allows the respective users at the primary client device and the replica client device to interact with the interface. The system may transmit application state between the primary device and the one or more replica device.

In a preferred embodiment, method steps 204-210 may be performed locally on the primary client device. There, the primary client device may access the primary client interface (block 204), analyze the primary client interface for sensitive information (block 206), create a replica display interface (block 208), and transmit the replica display interface (block 210). In this preferred embodiment, the sensitive information may be included within the primary client device only and may not be communicated to a server and/or other devices (where it could potentially be accessed by other parties). In other embodiments, the sensitive information may be transmitted to a second device that is remote from, and independent of, a first device. In this context "remote" may be defined to indicate that the first device is coupled to the second device via a communication network that is nearby (e.g., in a neighboring building) or far away (e.g., around the globe). In this context "independent" may be defined to indicate that the first device and the second device are separate computing devices.

The system may continually update both the primary display interface and the replica display interface (repeating method steps 204-210) throughout the duration of the screen sharing session. Throughout the screen sharing session, the system may receive one or more user inputs from the primary client and/or replica client indicating a change to the primary client interface or replica client interface. In turn, the system may update the primary client interface and/or replica client interface accordingly. For example, the system may update the primary client interface and/or replica client interface based on an event of a peripheral device attached to the primary client (e.g., change in position of mouse cursor, text input). The process of updating the replica client interface may include propagating a new mouse position from the primary client to the replica client.

To process the received user inputs, the system may distinguish between inputs received from the primary client device and the replica client device. In an embodiment, the system may consider each user input from the primary client device (i.e., the device originating the primary client interface which is being shared) a main user input and the each input from the replica client device as a secondary user input. Further, the system may enable a real-time clock or other array based clock to define a chronological order of received user inputs. For example, the system may timestamp each received user input. In another embodiment, the system may receive each user input along with a time-stamp and then determine a chronological order accordingly. In some embodiments, the time-stamps between the primary client interface and the replica client interface may not be synchronized and/or reconcilable. In these embodiments, the system may implement one or more processes to mitigate any issues, such as the use of Lamport timestamps.

The system may determine an order of operations based in part on the chronological order of the received user inputs and the type of user inputs (i.e., main vs. secondary). In an example embodiment, the system may process main user inputs prior to secondary user inputs even if the main user inputs are received after the secondary user inputs. In some embodiments, the system may eliminate received secondary user inputs if the main user inputs correspond to the same element and are received in relative proximity to the time which the secondary user input was received. For example, if a user of the replica client device begins typing in a text field and the user of the primary client device begins typing in the same text field immediately after, the system may only process the main user inputs. By prioritizing main user inputs, the system allows originating user to have greater control in the screen sharing session. In some embodiments, the replica client device may not allow any input and may only allow for viewing (e.g., the replica client may be a read-only screen viewer).

Figure 3:
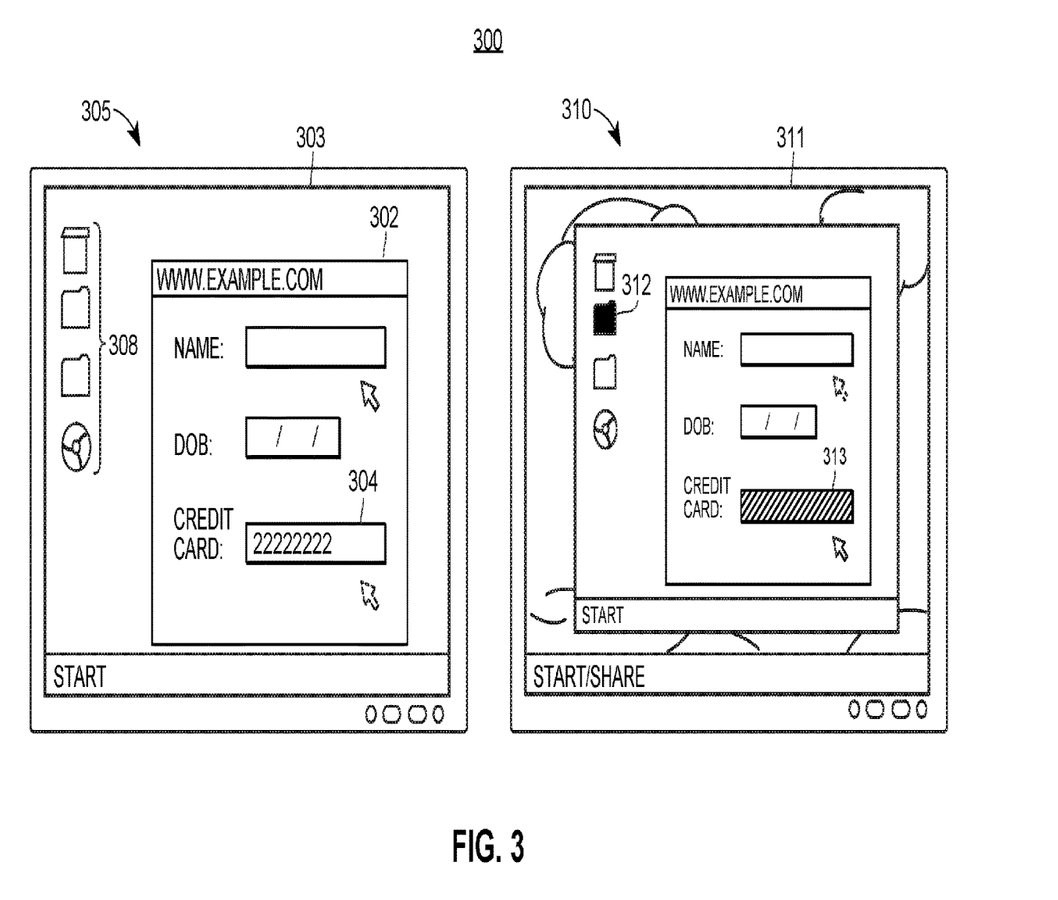
FIG. 3 is a schematic diagram illustrating an example of a first device displaying a display interface and a second device displaying a replica display interface.

FIG. 3 through FIG. 6 depict example screen sharing sessions facilitated by the techniques disclosed herein, according to some embodiments. FIG. 3 depicts an example screen sharing session 300 of a primary client device 305 displaying a primary client interface 303 and a replica device 310 displaying a replica client interface 311. The primary client interface 303 of primary client device 305 includes a webpage window 302 and icons 308. The webpage window 302 includes a number of data entry fields, including a data entry field for entering a credit card number 304. The primary client interface 303 and the replica client device 310 may be communicatively coupled via a computer network, such as the network 106 of FIG. 1. The client device 305 and replica client device 310 of FIG. 3 may each correspond to the screen sharing tool 112 of FIG. 1. The webpage window 302 may correspond to the browser 114 of FIG. 1. The primary client interface 303 of FIG. 3 and replica client interface 311 of FIG. 3 may each correspond to the user interface 110 of FIG. 1.

The replica client interface 311 includes an icon element 312 and an entry field element 313. The mouse cursors in client device 305 and replica device 310 may be, respectively, mirror images. That is, the top mouse cursor in interface 303 may correspond to the top mouse cursor in interface 310, and the bottom mouse cursor in interface 303 may correspond to the bottom mouse cursor in interface 310. The fact that these respective cursors may be mirror images may be denoted by the fact that a secondary cursor (e.g., the bottom cursor in interface 305 and the top cursor in interface 310) is displayed using dotted lines, to distinguish the cursor of the primary device from the cursor of the secondary device. In some embodiments, the cursors may be illustrated in different colors or otherwise distinguished by suitable means.

As described above with regard to method step 206, the methods and systems may determine that the element of the display interface for a credit card number 304 corresponds to sensitive information. This analysis may include, as discussed, identifying the data by pattern matching (e.g., a regular expression configured to identify credit card information) and/or by examining a meta data pertaining to a field (e.g., by determining that the input field is a credit card input field, or has a "protected" or "private" attribute). Other means of identifying sensitive and/or personal information may be available, in some embodiments.

In turn, the replica client interface 311 may include an obscured version 313 corresponding to the credit card 304 text field which may include a graphic replacing, covering, or obscuring any of the information included in the input field for the credit card 304. Further, the replica client interface 311 includes an icon element 312 which may correspond to an icon 308, which may include sensitive information. In an example embodiment, the icon may have been determined to correspond to sensitive information due to the one or more properties of the folder (e.g., name of icon, location, size).

Figure 4:
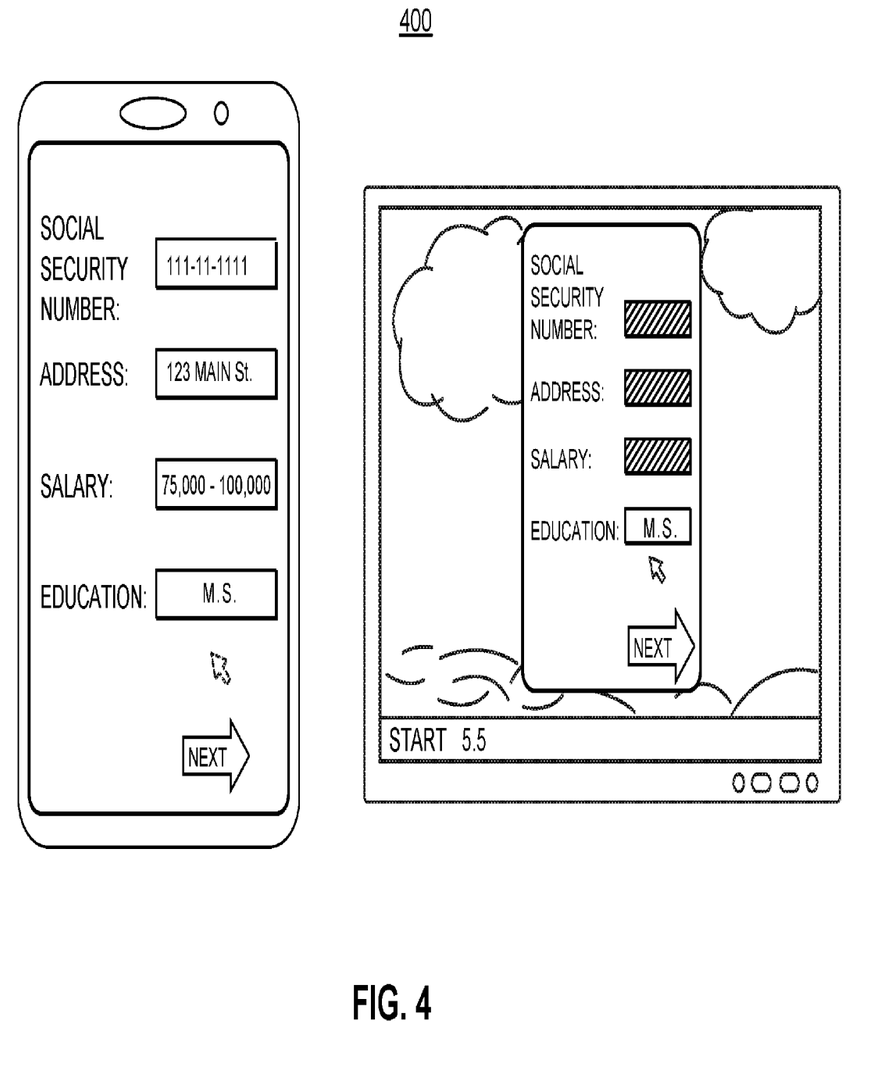
FIG. 4 is a schematic diagram illustrating a second example of a first device displaying a display interface and a second device displaying a replica display interface.

The replica client interface 311 of the example screen sharing session 300 may be located in a window of the replica client device 310. In other embodiments, the replica client interface 311 may be located in one or more windows of the replica user interface 311. In still other embodiments, the replica client interface 311 may be replicated to the exact dimensions as the display interface 303. Windows in the primary client interface 303 and the replica client interface 311 may be minimized, maximized, restored, and closed according to the windowing capabilities of any window manager of a host operating system of the primary client device 305. However, the screen sharing capabilities of the methods and systems described herein are cross-platform. That is, the host operating system of the primary client device 305 and any replica device(s) may differ. For example, FIG. 4 illustrates an example screen sharing session 400 including a primary client device which is a smart phone (vertical display), and a replica client device which is a desktop computer (horizontal display).

In the example screen sharing session 400, the replica client interface is illustrated as a scaled representation of the primary client interface of primary client device. Thus, the user of the replica client device may inspect an accurate representation of the primary client interface. The vertical primary client device of screen sharing session 400 may correspond to the primary client device 305 of FIG. 3 and/or, for example, the client device 103 of FIG. 1. The horizontal replica client device of screen sharing session 400 may correspond to the replica client device 310 of FIG. 3 and/or, for example, the client device 103 of FIG. 1. In an embodiment, a user of a primary device may determine, by making selections via a user interface at runtime, which inputs or segments in a user interface are private/protected/correspond to personal information. For example, the user of the smart phone horizontal primary device of screen sharing session 400 may open the data entry form depicted, which includes entry fields for social security number, address, salary, and education. At that time, the user interface may be in a data entry mode. The user interface may include a facility (not depicted) prompting the user to allow screen sharing (e.g., a message reading, "share my screen"). When the user activates the screen sharing facility by, for example, clicking on the message, the user interface may transition into a "data protection" mode. While in data protection mode, the user may be prompted to select (e.g., by clicking on each one) one or more of the fields/inputs in the user interface. Clicking on the fields may to toggle the visibility of the respective fields with respect to any replica client devices. For example, clicking on the "social security number" field once may change the field from public to protected (e.g., indicating that only the last four digits of the social security number are visible to the replica client. Clicking the social security number field a second time may toggle the visibility of the field from protected to private (e.g., indicating that the entire field will not be viewable by the replica client), and so forth. While in data protection mode, each field may denote the current protection level (e.g., by a textual and/or colored label). In some embodiments, a table or legend may be displayed wherein each row of the table corresponds to a field, and each row includes an indication of the protection level of each respective field in that row. Once the user has made visibility selections with respect to each field, the user may be prompted to confirm the user's selections, and the user interface may exit data protection mode, and enter a data entry mode once again. Although environment 400 depicts only two devices, any number of devices may be included, in some embodiments. For example, a single primary client device may transmit its output to N replica client devices, wherein N is any integer. In some embodiments having a large number of replica client devices (e.g., 10,000 or more), the means of transmission may be optimized to avoid network bottlenecks, such as by the use of a broadcast address, a UDP-based protocol, or another transmission protocol optimized for unidirectional/connectionless messaging.

Figure 5:
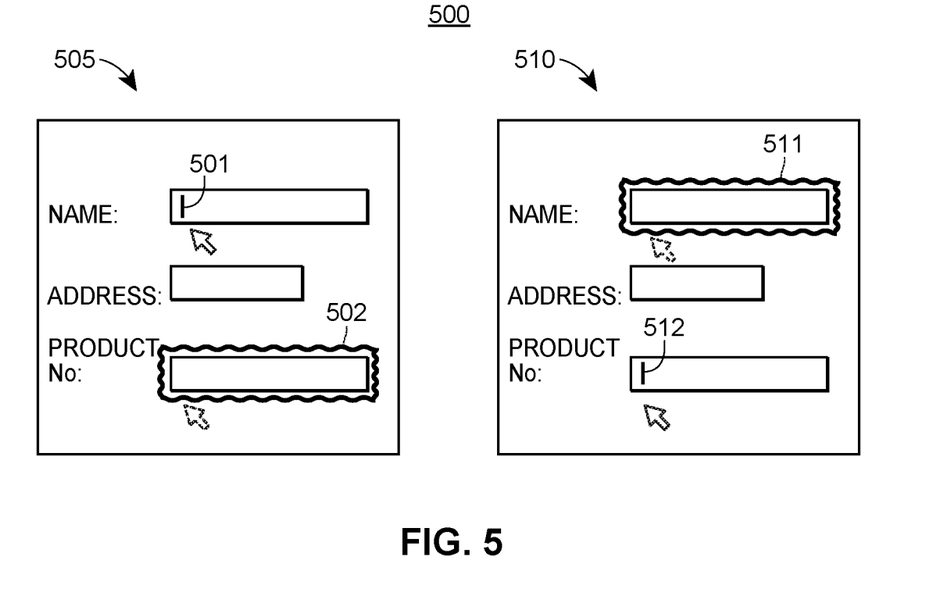
FIG. 5 is a schematic diagram illustrating an example of the secured screen sharing environment while receiving user inputs.

FIG. 5 depicts a schematic diagram of an example secured screen sharing environment 500 receiving user input. The environment 500 may include a primary client interface 505 and/or a replica client interface 510, which may correspond, respectively, to the primary client interface 305 of FIG. 3 and the replica client interface 310 of FIG. 3. In the example environment 500, the primary client interface 505 may receive a user input in a name field 501. In response, the system may alter a corresponding name input field 511 in the replica client interface 510 to indicate that the remote user has entered input into the name field 501. In some embodiments, the mere selection of name field 501 may be reflected in the replica client interface 510 by, for example, a corresponding dotted-line cursor being displayed in the corresponding name field 511. In an embodiment, the user of replica client interface 510 may not be able to select name field 511 until the user of primary client interface 505 has deselected name field 501. In some embodiments, the environment 500 may receive user inputs for both name field 501 and name field 511 concurrently, at which point the system may determine an order of operations as described above. In an embodiment, a user's selection of a field in primary client interface 505 may be visually emphasized in replica client interface 510, such as by a cursor which is encircled by a color, includes an animation, or otherwise calls attention to the fact that a selection has been made in the primary client device 505.

The example screen sharing environment 500 also illustrates that element 512 of replica client interface 510 is selected by the user of replica client device 510. The example primary client interface 505 displays an indication of the selection of element 512 by highlighting the corresponding element 502. In other embodiments, the environment 500 may implement any suitable means for signifying that the element is selected on the remote device, including by animation/color as discussed with respect to replica client device 510.

Figure 6:
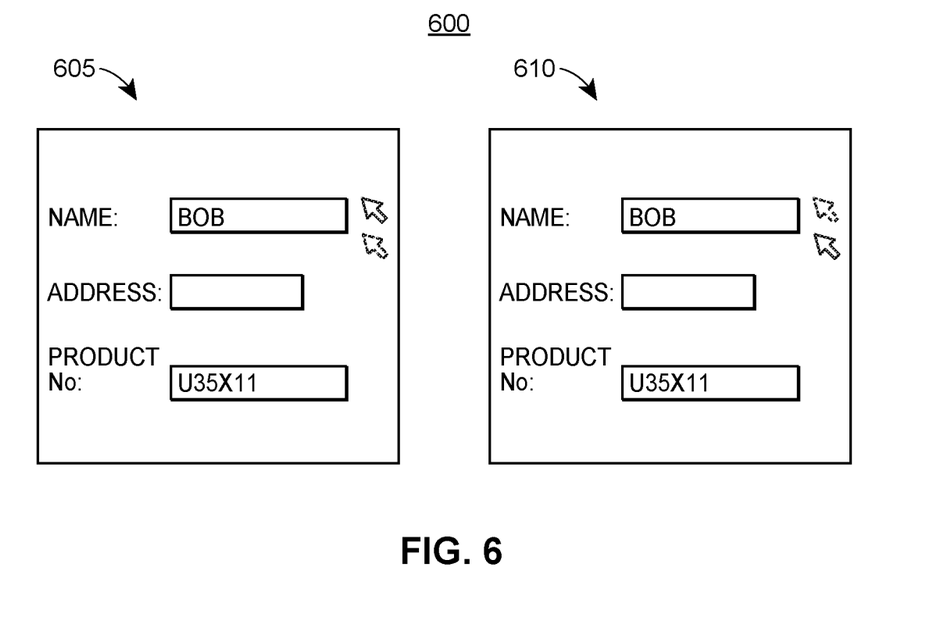
FIG. 6 is a schematic diagram illustrating an example of the secured screen sharing environment after receiving user inputs.

FIG. 6 is a schematic diagram illustrating an example of the secured screen sharing environment 600 after receiving user inputs (e.g., from the screen sharing environment 500 of FIG. 5). In this example screen sharing environment 600, because none of the elements of the display interface 605 correspond to sensitive information, none of the elements are altered for the replica client interface 610, and thus both interfaces 605 and 610 appear to be identical, except for the respective cursor positioning. In an embodiment, the environment 500 may determine that an element of the primary client interface 605 corresponds to sensitive information after user inputs are received, and subsequently modify/conceal that data, which may have the effect of obscuring that data from view in the replica client interface 610. Further, in other embodiments, the environment 600 may allow a user to indicate that one or more elements correspond to sensitive information that should not be displayed on the remote device, as discussed with respect to FIG. 4.

Figure 7:
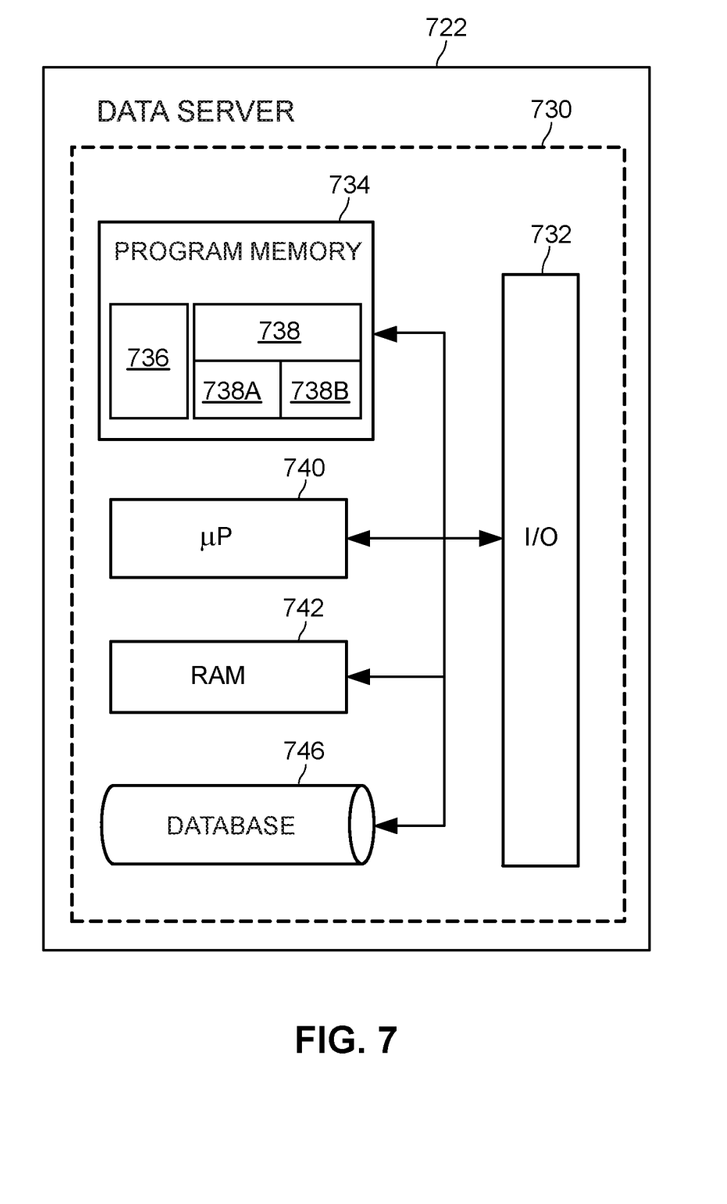
FIG. 7 is an exemplary architecture of a server of a system for screen sharing.

Referring now to FIG. 7, a data server 722 is depicted. The data server 722, which may correspond to server 115 of FIG. 1 and/or server 120 of FIG. 1, may include a controller 730. The controller 730 may include a program memory 734, a microcontroller or a microprocessor (μP) 740, a random-access memory (RAM) 742, and an input/output (I/O) circuit 732, all of which may be interconnected via an address/data bus. The program memory 734 may store computer-executable instructions, which may be executed by the microprocessor 740. In some embodiments, the controller 730 may also include, or otherwise be communicatively connected to, a database 746 or other data storage mechanism (e.g., one or more hard disk drives, optical storage drives, solid state storage devices, etc.). The database 746 may include data providing a secured screen sharing environment. It should be appreciated that although FIG. 7 depicts only one microprocessor 740, the controller 730 may include multiple microprocessors 740. Similarly, the memory 734 of the controller 730 may include multiple RAMs 736 and multiple program memories 738, 738A and 738B storing one or more corresponding server application modules, according to the controller's particular configuration. Although FIG. 7 depicts the I/O circuit 732 as a single block, the I/O circuit 732 may include a number of different types of I/O circuits (not depicted), including but not limited to, additional load balancing equipment, firewalls, etc. The RAM 736 and RAM 742 and the program memories 738, 738A and 738B may be implemented in a known form of computer storage media, including but not limited to, semiconductor memories, magnetically readable memories, and/or optically readable memories.

Figure 8:
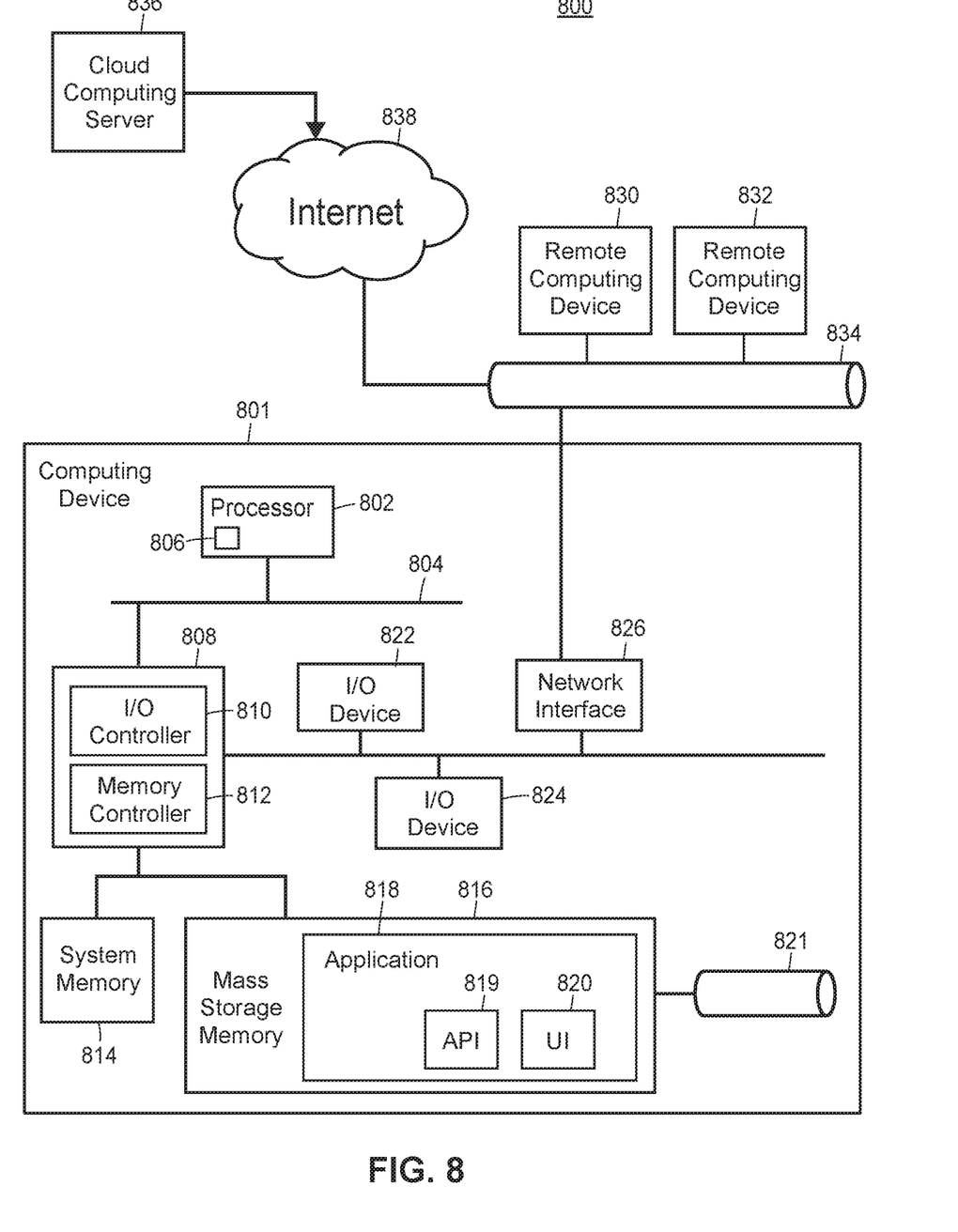
FIG. 8 illustrates a block diagram of a client device to implement the various user interfaces, methods, functions, etc. for secured screen sharing in accordance with the described embodiments.

FIG. 8 illustrates an exemplary computing environment 800 configured to, for example, implement the system 100 and method 200 as described herein. The environment 800 may include a cloud computing server 836 which may correspond to server 120 of FIG. 1 and/or server 115 of FIG. 1. Environment 800 may include a network 838 (e.g., an Internet and/or private network) which may correspond to the computer network 106 of FIG. 1. The environment 800 may include a remote computing device 830 and a remote computing device 832, a network link 834, and a computing device 801.

The computing device 801 may include a processor 802 which may be coupled to an interconnection bus 804. The processor 802 may include a register set or register space 806, which is depicted in FIG. 8 as being entirely on-chip, but which could be located entirely or partially off-chip and could be directly coupled to the processor 802 via dedicated electrical connections and/or via the interconnection bus 804. The processor 802 may include one or more suitable processor(s) (e.g., central processing units (CPUs) and/or graphics processing units (GPUs)), processing unit(s) and/or microprocessor(s). Although not shown in FIG. 8, the computing device 801 may be a multi-processor device and, thus, may include one or more additional processors that are identical or similar to the processor 802 and that are communicatively coupled to the interconnection bus 804. The processor 802 of FIG. 8 may be coupled to a chipset 808, which may include a peripheral input/output (I/O) controller 810 and a memory controller 812. As is well known, a chipset typically provides I/O and memory management functions as well as a plurality of general purpose and/or special purpose registers, timers, etc. which may be accessible and/or used by one or more processors coupled to the chipset 808. The memory controller 812 may perform functions enabling the processor 802 to access a system memory 814 and a mass storage memory 816. The system memory 814 may include any desired type of volatile and/or non-volatile memory such as, for example, static random access memory (SRAM), dynamic random access memory (DRAM), flash memory, read-only memory (ROM), etc. The mass storage memory 816 may include any desired type of mass storage device.

The computing device 801 may implement an application 818 (e.g., a screen sharing tool corresponding to those depicted in FIG. 3 and FIG. 4), which may include an application programming interface (API) 819 implementing functions and instructions as described by the method 200 of FIG. 2, and a user interface 820 to receive user input, which may correspond to, for example, the user interface 300 of FIG. 3 and/or the user interface 310 of FIG. 3. In an embodiment, non-transitory program functions, modules and routines (e.g., an application 818, an API 819, and the user interface 820, etc.) may be stored in mass storage memory 816, loaded into system memory 814, and executed by a processor 802. The user interface 820 may correspond to the user interface 305 of FIG. 3 and/or the user interface 110 of FIG. 1, for example. Alternatively, or in addition, the non-transitory program functions, modules, and routines may be provided from computer program products that are stored in tangible computer-readable storage media (e.g., RAM, hard disk, optical/magnetic media, etc.). Mass storage 816 may include a cache memory 821 storing application data and other data for use by the application 818.

The peripheral I/O controller 810 may perform functions enabling the processor 802 to communicate with peripheral input/output (I/O) devices 822 and 824, a network interface 826, via a peripheral I/O bus 828. The I/O devices 822 and 824 may be any desired type of I/O device such as a keyboard, a display (a liquid crystal display (LCD), a cathode ray tube (CRT) display, etc.), a navigation device (a mouse, a trackball, a capacitive touch pad, a joystick, etc.), etc. The I/O devices 822 and 824 may be used with the application 818 to enable secured screen sharing as described in relation to the figures. The network interface 826 may include support for Wi-Fi network, Bluetooth, Infrared, cellular, or other wireless data transmission protocols. In other embodiments, one element may simultaneously support each of the various wireless protocols employed by the computing device 801. For example, a software-defined radio may be able to support multiple protocols via downloadable instructions. In operation, the computing device 801 may be able to periodically poll for visible wireless network transmitters (e.g., both cellular and local network) on a periodic basis. Such polling may be possible even while normal wireless traffic is being supported on the computing device 801. The network interface 826 may be an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 812 and the I/O controller 810 are depicted in FIG. 8 as separate functional blocks within the chipset 808, the functions performed by these blocks may be integrated within a single integrated circuit or may be implemented using two or more separate integrated circuits. The system 800 may also implement the user interface 110 of FIG. 1 and screen sharing tool 112 of FIG. 1 on remote computing devices 830 and 832. The remote computing devices 830 and 832 may communicate with the computing device 801 over a network link 834. For example, the computing device 801 may receive a user profile from one or more of remote computing device 830, 832. In some embodiments, the application 818 may retrieve the user interface 110 and screen sharing tool 112 from a cloud computing server 836 via the network 838. When using the cloud computing server 836, the retrieved application 818 may be programmatically linked with the computing device 801. In some embodiments, the application 818 may communicate with backend components such as the data system 104 in FIG. 1 via the network 838.

In operation, a user of the computing device 801 may access the computing device 801 via I/O device 822 and/or I/O device 824. The processor 802 may include instructions which cause input typed by a user to be received and processed by an I/O device and I/O controller 810. The input from the user may be read by an application (e.g., application 818) executing in system memory 814. The application 818 may receive the input and add the input into a particular portion of the user interface 820. For example, to return to the example discussed with respect to FIG. 3, the input may be added to the credit card field 304. By the time the user types in the input corresponding to credit card field 304, the application 818 may have identified the credit card field 304 as corresponding to sensitive data, and may mask or obscure the information according on a character-by-character basis, as it is typed in by the user. For example, while the I/O controller may pass character data of an integer "1" to the application 818, the application 818 may store a mask character (e.g., "X") in the credit card field 304 of the user interface 820.

In some embodiments, the application may store the data received, "1" in this example, in the field and the masking of sensitive data may be performed at the time the replica display is transmitted to a replica client device. For example, the credit card field 304 of user interface 820 may include an unmasked credit card number, such that the number is viewable by the user of a primary client device.

As the user accesses the application 818, and changes the state of data in the application 818, instructions may be executed by the processor 802 which read the state of the data in the application 818 and which process the data to determine whether the data is sensitive data, or not. The application 818 may transmit data which is not sensitive to remote computing device 830, and may avoid transmitting data that is sensitive to the remote computing device 830.

The application 818 may include instructions for creating a connection with another computing device (e.g., a TCP/IP connection with the remote computing device 830) that will allow screen sharing. The application 818 may also include instructions for transmitting a user interface view via a one-way transmission protocol (e.g., UDP). In some embodiments, the screen sharing may be facilitated via the use of a standard screen sharing protocol, such as Remote Desktop Protocol (RDP) and/or Remote Frame Buffer (RFB) protocol. The methods and systems described herein which pertain to the masking of data either by pattern and/or user interface type may be provided as extensions and/or additions to existing standard protocols.

In some embodiments, two instances of computing device 801 may correspond to a primary client device and a replica client device, as described above. In that case, the primary client device may initiate a connection to the replica client device, or vice versa. The connection may be established directly between the client device and replica device, and/or may be facilitated by an intermediary, such as via the cloud computing server 836 or via the screen sharing server 115. The connection may be established in response to a connect message sent from a client to another client. Once the connection is established, the replica client may exchange receive state information with the client device on a bidirectional basis. However, as discussed, one-way state transfer may also be established, according to some embodiments and scenarios.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the computer network 106 may include but is not limited to any combination of a LAN, a MAN, a WAN, a mobile, a wired or wireless network, a private network, or a virtual private network. Moreover, while only two client computing devices are illustrated in FIG. 1 to simplify and clarify the description, it is understood that any number of client computers or display devices are supported and can be in communication with the servers 120 or 115. The communication between the client computing devices 102 and 103 and the servers 120 and 115 can adhere to any suitable protocol, such as TCP/IP, WebSockets, etc.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations. As stated above, the multiple machines may communication by any of a number of different communication protocols including, without limitation, TCP/IP, UDP, and WebSockets.

The one or more processors may also operate to support performance of the relevant operations in a "cloud computing" environment. For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result.

In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for secured screen sharing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the above text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed:

1. A computer-implemented method for secured screen sharing, the method comprising:
   receiving, by a server, an indication to initiate a screen sharing session between a first client device and a second client device;
   receiving, by the server, information associated with a primary client interface of a first client device including a user interface element in the primary client interface;
   analyzing, by the server, the user interface element to determine a particular portion of the user interface element that includes sensitive information;
   masking, by the server, the particular portion of the user interface element that includes the sensitive information;
   generating, by the server, a replica client interface of the primary client interface including a replica user interface element corresponding to the user interface element, the replica user interface element including the masked sensitive information;
   transmitting, by the server, the replica client interface to the second client device;
   receiving, by the server, an indication of one or more primary user inputs from the first client device and an indication of one or more secondary user inputs from the second client device;

determining, by the server, a chronological order of operations of the one or more primary user inputs and the one or more secondary user inputs;

determining, by the server, a ranking of importance of the one or more primary user inputs and the one or more secondary user inputs; and creating, by the server, an order of operations based upon the chronological order of operations and the ranking of importance of the one or more primary user inputs and the one or more secondary user inputs.

2. The computer-implemented method of claim 1, further comprising:

masking, by the server, a first user interface input in the primary client interface and a second user interface input in the replica client interface based upon the order of operations;

transmitting, by the server, an indication of the masked primary client interface to the first client device; and transmitting, by the server, an indication of the masked replica client interface to the second client device.

3. The computer-implemented method of claim 2, wherein the masked primary client interface and the masked replica client interface are identical except for the first and second user interface inputs, each of the first and second user interface inputs corresponding to the sensitive information.

4. The computer-implemented method of claim 1, wherein the sensitive information includes personally identifiable information.

5. The computer-implemented method of claim 1, wherein masking the particular portion of the user interface element includes:

replacing, by the server, the particular portion of the user interface element that includes the sensitive information with a graphic element of a same size and shape as the particular portion of the user interface element such that the graphic element obscures the sensitive information.

6. A system for secured screen sharing, the system comprising:

a first client device;

a second client device; and a server including a memory and one or more processors, the memory including instructions, that when executed by the one or more processors, cause the server to:

receive an indication to initiate a screen sharing session between the first client device and the second client device;

receive information associated with a primary client interface of the first client device including a user interface element in the primary client interface;

analyze the user interface element to determine a particular portion of the user interface element that includes sensitive information;

mask the particular portion of the user interface element that includes the sensitive information;

generate a replica client interface of the primary client interface including a replica user interface element corresponding to the user interface element, the replica user interface element including the masked sensitive information;

transmit the replica client interface to the second client device;

determine a chronological order of operations of one or more primary user inputs from the first client device and one or more secondary user inputs from the second client device;

determine a ranking of importance of the one or more primary user inputs and the one or more secondary user inputs; and create an order of operations based upon the chronological order of operations and the ranking of importance of the one or more primary user inputs and the one or more secondary user inputs.

7. The system of claim 6, wherein the instructions, that when executed by the one or more processors, further cause the server to:

receive an indication of the one or more primary user inputs from the first client device; and receive an indication of the one or more secondary user inputs from the second client device.

8. The system of claim 7, wherein the instructions, that when executed by the one or more processors, further cause the server to:

mask a first user interface input in the primary client interface and a second user interface input in the replica client interface based upon the order of operations;

transmit an indication of the masked primary client interface to the first client device; and transmit an indication of the masked replica client interface to the second client device.

9. The system of claim 8, wherein the masked primary client interface and the masked replica client interface are identical except for the first and second user interface inputs, each of the first and second user interface inputs corresponding to the sensitive information.

10. The system of claim 6, wherein the sensitive information includes personally identifiable information.

11. The system of claim 6, wherein the instructions that cause the server to mask the particular portion of the at least one user interface element further cause the server to:

replace the particular portion of the user interface element that includes the sensitive information with a graphic element of a same size and shape as the particular portion of the user interface element such that the graphic element obscures the sensitive information.

12. A non-transitory computer-readable medium storing instructions for secured screen sharing, the instructions when executed by one or more processors of a computing device cause the computing device to:

receive an indication to initiate a screen sharing session between a first client device and a second client device;

receive information associated with a primary client interface of the first client device including a user interface element in the primary client interface;

analyze the user interface element to determine a particular portion of the user interface element that includes sensitive information;

mask the particular portion of the user interface element that includes the sensitive information;

generate a replica client interface of the primary client interface including a replica user interface element corresponding to the user interface element, the replica user interface element including the masked sensitive information;

transmit the replica client interface to the second client device;

determine a chronological order of operations of one or more primary user inputs from the first client device and one or more secondary user inputs from the second client device;

determine a ranking of importance of the one or more primary user inputs and the one or more secondary user inputs; and create an order of operations based upon the chronological order of operations and the ranking of importance of the one or more primary user inputs and the one or more secondary user inputs.

13. The non-transitory computer-readable medium of claim 12, further including instructions that when executed by the one or more processors of the computing device cause the computing device to:
   receive an indication of the one or more primary user inputs from the first client device; and
   receive an indication of the one or more secondary user inputs from the second client device.

14. The non-transitory computer-readable medium of claim 13, further instructions that when executed by the one or more processors of the computing device cause the computing device to:
   mask a first user interface input in the primary client interface and a second user interface input in the replica client interface based upon the order of operations;
   transmit an indication of the masked primary client interface to the first client device; and
   transmit an indication of the masked replica client interface to the second client device.

15. The non-transitory computer-readable medium of claim 14, wherein the masked primary client interface and the masked replica client interface are identical except for the first and second user interface inputs, each of the first and second user interface inputs corresponding to the sensitive information.

16. The non-transitory computer-readable medium of claim 12, wherein the sensitive information includes personally identifiable information.

\* \* \* \* \*